United States Patent [19]

Kruesi et al.

[11] Patent Number: 4,500,498

[45] Date of Patent: Feb. 19, 1985

[54] AMMONIUM CHLORIDE-AMMONIUM HYDROXIDE STRIP FOR THE RECOVERY OF ANHYDROUS ZINC CHLORIDE

[75] Inventors: Paul R. Kruesi; William H. Kruesi, both of Golden, Colo.

[73] Assignee: Cato Research, Inc., Wheat Ridge, Colo.

[21] Appl. No.: 571,935

[22] Filed: Jan. 19, 1984

[51] Int. Cl.³ .............................................. C01G 9/04
[52] U.S. Cl. .................................... 423/100; 423/101; 423/24; 423/32; 423/34; 423/92; 423/139; 423/140; 423/157; 423/158; 423/181; 423/184; 423/491; 204/66
[58] Field of Search ................. 423/100, 101, 491, 24, 423/32, 34, 92, 139, 140, 157, 158, 181, 184; 204/66

[56] References Cited

U.S. PATENT DOCUMENTS

| | | | |
|---|---|---|---|
| 1,388,086 | 8/1921 | Ashcroft | 204/71 |
| 3,441,372 | 4/1969 | Pegler et al. | 423/100 |
| 3,446,720 | 5/1969 | Brooks | 204/112 |
| 3,673,061 | 6/1972 | Kruesi | 204/105 R |
| 4,058,585 | 11/1977 | MacKay et al. | 423/100 |
| 4,421,616 | 12/1983 | Bjune et al. | 423/100 |

FOREIGN PATENT DOCUMENTS 1026951  2/1978  Canada ..................... 53/329

OTHER PUBLICATIONS

Gmelin's Handbuch der Anorganschem Chemie, Zinc Achte Aflage, Verlog Chemie, (1956), pp. 871-875.
U.S. Bureau of Mines publication RI 8524, (1981).
Nogueira, E. D., et al., "Winning Zinc Through Solvent Extraction and Electrowinning," *E&MJ*, 92-94, (Oct., 1979).
Thomas, B. K., et al., "Leaching of Oxidic Zinc Materials with Chlorine and Chlorine Hydrate," *Metallurgical Transactions B*, 12B:281-285 (Jun. 1981).
Forrest, V. M. P., et al., "The Extraction of Zinc and Cadmium by Tri—N—Butyl Phosphate from Aqueous Chloride Solutions," *J. Inorg. Chem.*, 31:187-197 (1968).
May, J. T., et al., "Dehydrating Magnesium Chloride by Double—Salt Decomposition," Bureau of Mines Report of Investigations 8277, pp. 1-19.
Allain, R. J., "A New Economic Process for Making Anhydrous Magnesium Chloride," TMS—AIME, p. 325, (Feb. 24-28, 1980).

*Primary Examiner*—John Doll
*Assistant Examiner*—Robert L. Stoll
*Attorney, Agent, or Firm*—Sheridan, Ross & McIntosh

[57] ABSTRACT

Anhydrous zinc chloride is produced from an aqueous feed solution containing zinc chloride from an aqueous feed solution containing zinc chloride. The zinc chloride is extracted onto an organic extractant known to the art such as tributyl phosphate, primary, secondary or tertiary amines, and quaternary amine salts. The loaded extractant is then stripped with aqueous stripping solution containing ammonium chloride and ammonium hydroxide. The zinc ammine chloride formed in this aqueous stripping solution is separated from the stripping solution and can then be heated to form anhydrous zinc chloride and ammonia. This anhydrous zinc chloride is suitable as a feed material to a fused salt electrolysis process for the production of zinc.

8 Claims, No Drawings

4,500,498

AMMONIUM CHLORIDE-AMMONIUM HYDROXIDE STRIP FOR THE RECOVERY OF ANHYDROUS ZINC CHLORIDE

TECHNICAL FIELD

This invention pertains to the field of hydrometallurgy, in particular to the recovering of a pure anhydrous zinc chloride product suitable for electrolysis to produce elemental zinc.

BACKGROUND OF THE INVENTION

Zinc is a widely useful metal and its chemical compounds have a number of important applications. It is recovered from both oxidic and sulfidic ores. Another source of zinc is scrap. As zinc diecastings are important in a number of applications, and in particular as components of automobiles, a large amount of zinc metal-containing scrap is generated.

In contrast to copper and lead where a large portion of this scrap is recycled back to primary products, in the case of zinc only a small portion is recycled. An economic means of producing high purity metal from scrap is needed.

In the recovery of zinc from these materials, and in particular from sulfidic ores, it is common to roast the materials, producing noxious gases which are not totally recovered. This problem prompted a desire to develop alternate means, particularly hydrometallurgical means, which do not create the problems associated with zinc smelting. Aqueous electrolysis is one of these methods. However, this method is made expensive by the poor current efficiencies of the cells and by the fact that the zinc sulfate solutions commonly used for aqueous electrolysis are relatively poor electrical conductors. This method is also expensive in that zinc is plated on cathode sheets from which it must be stripped, washed, dried and melted.

Fused salt electrolysis is another method for recovering elemental zinc, but unless the starting material is anhydrous zinc chloride, moisture present in the feed will cause current inefficiency and carbon anode consumption. Prior methods for the production of anhydrous zinc chloride have been expensive and cumbersome.

Another problem associated with the use of anhydrous zinc chloride is caused by the extreme hygroscopic nature of this material. Accordingly, a simple hydrometallurgical process for producing anhydrous zinc chloride is required. This invention provides such a process and also produces an intermediate zinc chloride ammine compound which is more stable than anhydrous zinc chloride and may be washed and stored without absorbing moisture but is easily decomposed by heating to form anhydrous zinc chloride.

DISCLOSURE STATEMENT

Alternative processes have been suggested for the hydrometallurgical recovery of zinc. Many of these produce an aqueous zinc chloride solution.

In U.S. Pat. No. 3,673,061 to Kruesi, a process is described in which zinc sulfide is converted to an aqueous zinc chloride solution and elemental sulfur, thus avoiding the difficulties associated with smelting.

In treating oxidic zinc concentrates it has been well known to do a chloridizing roast at high temperature using sodium or calcium chloride. This has been effective in removing zinc from oxides as in pyrite cinders, but the subsequent recovery of the zinc has involved complex processes. One such process is described in E. P. Nogueira, et al., "Winning Zinc Through Solvent Extraction and Electrowinning", E & MJ, October 1979. Zinc chloride in aqueous solution is extracted with secondary amine, stripped with water, then re-extracted with DEHPA, followed by stripping with dilute acid and electrowinning. While this approach is commercially successful, a great deal of cost is involved in converting zinc chloride to zinc sulfate for the usual commercial electrolysis and in the aqueous electrolysis itself.

Other sources of zinc include zinc oxides obtained from drosses and residues, as byproducts in copper and brass refining, zinc processing, and from electric arc steel making processes. B. K. Thomas et al "Leaching of Oxidic Zinc Materials with Chlorine and Chlorine Hydrate", 12B, *Metallurgical Transactions B,* 281, June 1981, describes a leaching process for these materials which produces an aqueous solution of zinc chloride.

The potential advantages of processes which might result in pure anhydrous chloride, which could be electrolyzed to pure zinc metal and recycle chlorine, have long been recognized. As early as 1921 Ashcroft received U.S. Pat. No. 1,388,086 for a method of producing zinc chloride in fused salt electrolysis. His methods were not practical in that the handling of ores in fused salts was difficult, and no provision was made for the generation and purification of the zinc chloride prior to electrolysis. U.S. Bureau of Mines publication RI 8524 (1981) suggests a flowsheet for recovering zinc by fused salt electrolysis and recycling chlorine. The difficulty in the suggested process is the tremendous cost involved in the evaporation of water to produce anhydrous zinc chloride.

It has been recognized for some time that zinc chloride could be extracted from an aqueous solution by certain organic reagents. Specifically, tributyl phosphate has been known as an extractant for this purpose, as cited in U.S. Pat. No. 3,441,372, which describes the use of dilute sulfuric or nitric acid or dilute solutions of salts other than chlorides to strip the zinc from the extractant. V. M. P. Forrest, et al, "The Extraction of Zinc and Cadmium by Tri-n-Butyl Phosphate from Aqueous Chloride Solutions", 31 *J. Inorg. Chem.* 187–197, 1969, describes the effect of extractant dilution, metal ion concentration, and acidity on the extraction process. This paper shows strong effect of chloride ion concentration in the aqueous in enhancing the extraction of zinc into the organic by a salting-out effect.

It is further known that other organic reagents such as secondary amines as described in U.S. Pat. No. 3,466,720 could be used. Canadian Pat. No. 1,026,951 describes the use of primary, secondary, and tertiary amine salts, and quaternary ammonium compounds. Quaternary amine salts are also known to be used for such organic extraction.

A great deal of purification of zinc away from impurities such as cadmium and divalent iron, can be accomplished by the use of these reagents.

In co-pending application by P. Kruesi, U.S. Ser. No. 06/400,947, filed July 22, 1982, a substantial improvement over the prior art is shown by stripping the zinc-loaded organic with an organic reagent immiscible in the extractant. By this means anhydrous zinc chloride could be prepared either directly or through the intermediary zinc ammine chloride without the necessity of evaporating water. The difficulty with this improvement is that traces of the organic strippant could react with the anhydrous zinc chloride or be catalyzed in reactions by it, and these could result in undesirable side reactions.

It has been surprising to find that zinc ammine chloride could be directly formed in stripping the known organic solvent by an aqueous solution comprising ammonium chloride and ammonium hydroxide. In view of the known effect of ammonium chloride in enhancing the loading of zinc chloride onto organic solvents such as tributyl phosphate, it is surprising to find that those solvents can be successfully stripped with an ammonium chloride-ammonium hydroxide solution. It is also unexpected that the zinc may be stripped in the presence of high concentrations of chloride ion. In the prior art, it is taught that the stripping agent for a zinc-loaded organic extractant functioned by serving as a solvent, of low or no chloride content, for the zinc chloride. The present invention is contrary to the prior art as it discloses stripping with a solution of high chloride concentration.

SUMMARY OF THE INVENTION

Anhydrous zinc chloride, suitable for fused salt electrolysis to produce elemental zinc, is produced from an aqueous feed solution containing zinc chloride. This aqueous feed solution may be generated by a number of processes for the dissolution of scrap, or from waste materials and by-products of other metallurgical processes. The zinc chloride-containing aqueous feed solution may also include typical impurities such as cadmium, iron, lead, and copper.

The zinc chloride is extracted into an organic extractant known to the art such as tributyl phosphate, primary, secondary or tertiary amines, and quaternary amine salts. The loaded extractant is then stripped with an aqueous stripping solution containing ammonium chloride and ammonium hydroxide. The zinc ammine chloride is formed in this aqueous stripping solution.

The zinc ammine chloride is separated from the stripping solution by decantation, filtering, centrifuging, or other means known to the art. The zinc ammine chloride crystals can be dried and stored for substantial periods of time as the crystals are stable and not hygroscopic. The zinc ammine chloride is readily decomposed into anhydrous zinc chloride and ammonia by heating.

The anhydrous zinc chloride may be used as feed to a fused salt electrolysis process for the production of elemental zinc and chlorine which may be recycled, for example, to a chloridizing solution for producing an aqueous solution of zinc chloride. It may also be used for other applications, e.g., in batteries or as a catalyst in the conversion of coal to oil.

DETAILED DESCRIPTION OF THE PREFERRED EMBODIMENT

The preferred starting material is zinc chloride in an aqueous solution which also contains typical impurities such as iron, copper, lead, cadmium, alkaline earths metals and alkali metals. The solution typically contains zinc chloride in concentrations between about one gram per liter and about five hundred grams per liter and preferably between about 100 grams per liter and about 400 grams per liter.

The process produces anhydrous zinc chloride of a purity in excess of about 90 weight percent. Depending upon the solvent extraction agent selected and the number of extraction stages, essentially all zinc in solution may be recovered and the product may be of any desired purity up to 100 weight percent.

The aqueous solution containing zinc chloride is first contacted with an organic extraction agent to selectively extract zinc chloride. Suitable extraction agents are known to the art and include tributyl phosphate, primary, secondary and tertiary amines and quaternary amine salts. The extraction agent chosen will depend upon the impurities present in the aqueous phase from which a separation is desired. Tributyl phosphate is preferred when no iron is present in the solution. In the presence of large amounts of iron, secondary amine is preferred. It is desirable to dilute the extraction agent with an inert solvent carrier such as kerosene. A preferred composition is 50 volume percent tributyl phosphate and 50 volume percent kerosene. Another preferred composition is 75 volume percent tributyl phosphate and 25 volume percent kerosene. Amine extractants in various aliphatic or aromatic solvents are also suitable reagents for extracting zinc chloride.

The loading of zinc chloride on the organic extractant is enhanced by the presence of high concentrations of chloride ion. Because hydrochloric acid may also load on the extraction agent if it is present in large amounts in the aqueous solution, it is desirable that the free acid be as low as is practical. A suitable aqueous feed would be at pH between about 1 and about 5 and preferably at pH between about 2 and about 3, with about 3 normal to about 6 normal ammonium chloride or about 1 normal to about 3 normal sodium chloride or other chlorides used as salting agents to increase zinc chloride extraction.

The solvent extraction process is carried out by contacting the aqueous zinc chloride solution with the extraction agent, preferably using multiple countercurrent stages. The organic to aqueous ratio may vary according to the extractant and aqueous system chosen. An organic to aqueous ratio of more than about one to one is preferred. The number of extraction stages preferred depends upon the concentration of zinc chloride in the aqueous phase and the desired separation from impurities. By this method, between about 20 and about 100 weight percent of the zinc chloride in solution may be extracted to produce a loaded extraction agent having a zinc chloride concentration of between about one and about thirty grams per liter.

The loaded organic extractant is next contacted with an aqueous stripping solution containing ammonium chloride and ammonium hydroxide. In aqueous solutions, ammonia is present as ammonium hydroxide. Therefore, ammonia or ammonium hydroxide may be added as a reagent to the aqueous stripping solution. A concentration of ammonium chloride in the strip of at least about 75 g/l is required and about 250 g/l is preferred. Sufficient ammonium hydroxide should be present in the stripping solution to combine with all of the zinc present to form $Zn(NH_4)_2Cl_2$, zinc ammine chloride. Ammonium hydroxide in the stripping solution should be equal to about two moles of zinc to be stripped (e.g. about two ammonia ions are required for every one zinc ion). If insufficient ammonia is present, stripping will be incomplete. If a slight excess of ammonia is present no difficulty ensues, as the zinc ammine chloride is stable in the presence of excess ammonia. Zinc chloride and zinc ammonium chloride can be present in the stripping solution up to saturation, since the formation of crystals during stripping does not interfere with the process. Typically, at temperatures of around 80° C., concentrations of about 200 g/l of zinc (expressed as zinc chloride) do not interfere with stripping.

In a preferred embodiment, the stripping solution contains from about 10 to about 200 g/l zinc, as zinc chloride or zinc ammine chloride, preferably 10 to about 50 g/l zinc, and most preferably 20 g/l zinc; from about 75 to about 300 g/l ammonium chloride, preferably 100 to about 250 g/l ammonium chloride and most preferably 250 g/l ammonium chloride; and ammonium hydroxide equal to about 1.5 to 2.5 moles per mole of zinc to be stripped, and most preferably two moles ammonium hydroxide per mole of zinc to be stripped. Also in the preferred embodiment, the loaded organic extractant is contacted with the aqueous stripping solution at a temperature of from about 20° C. to about 80° C. After stripping, the solution is allowed to cool and zinc ammine chloride equivalent to the stripped zinc crystallizes and may be recovered. If the stripping solution and organic extractant are both at a temperature less than about 80° C., insoluble zinc ammine chloride may form in the aqueous stripping solution during stripping. The zinc ammine chloride is very crystalline and reports to the aqueous stripping phase without causing emulsion difficulties. With the addition of ammonium hydroxide, the strippant is regenerated and ready to strip additional solvent.

Zinc ammine chloride is separated from the strippant solution by such techniques known in the art as filtration, decantation or centrifugation. The crystals can be washed and recrystallized if desired from an ammonium chloride/ammonium hydroxide system. The crystals are dried and may be stored for extended periods.

The zinc ammine chloride is readily decomposed to form zinc chloride and ammonia by heating to a temperature of at least 270° C., but less than 500° C., at which temperature zinc chloride begins to have an appreciable vapor pressure. A preferred temperature for the decomposition of the zinc ammine chloride to the anhydrous chloride is between 350° and 450° C. at ambient pressure. It is preferred that the decomposition of the anhydrous zinc chloride be conducted in inert atmosphere so that hydrolysis of zinc chloride by oxygen and moisture is avoided.

The invention produces anhydrous zinc chloride of up to more than 99.9 weight percent purity, and by this method essentially all of the zinc chloride originally present in the aqueous solution may be recovered.

EXAMPLES

Example 1

175 ml of a 50 volume percent tributyl phosphate, 50 volume percent kerosene solvent was loaded with 25 ml of an aqueous solution containing 200 g/l zinc as zinc chloride. 3.19 gms of zinc loaded on the solvent. The solvent was contacted once with a stripping solution at 80° C. of 50 ml volume containing 280 g/l NH₄Cl, 200 g/l zinc chloride (4.81 gms of zinc) and 15 ml of concentrated ammonium hydroxide (4 gms NH₃). Upon separation of the phases and cooling to ambient temperature, 11.1 gms of zinc ammine chloride were recovered assaying 4.63 gms of zinc. The strippant contained 2.15 gms of zinc still soluble. 62% of the zinc had been stripped from the solvent in a single stage and recovered as zinc ammine chloride. The ammonium hydroxide in the strippant, despite being present in amounts substantially above stoichiometric, did not interfere. The high concentration of zinc in the stripping solution also did not interfere.

Example 2

175 ml of a 50 volume percent tributyl phosphate, 50 volume percent kerosene solvent was contacted with 25 ml of 200 g/l zinc as zinc chloride in aqueous solution. 3.24 gms of zinc loaded onto the solvent. The solvent was stripped once at 80° C. with a stripping solution containing 140 g/l ammonium chloride, 100 g/l zinc chloride (2.4 gms of zinc), and 10 ml of concentrated ammonium hydroxide (2.7 gms ammonium). Upon phase separation and cooling to ambient temperature, 6.3 gms of zinc ammine chloride were recovered containing by assay 2.74 gms of zinc. The stripping solution contained 1.42 grams of zinc. 54 percent of the zinc had been stripped in a single contact and recovered as zinc ammine chloride.

Example 3

100 ml of a solution containing 200 g/l zinc was contacted with 100 ml of 50 volume percent tributyl phosphate and 50 volume percent kerosene. 3.6 gms of zinc loaded onto the solvent. The solvent was stripped at 80° C. with a solution of 100 ml of water containing 1 gm of ammonia. A precipitate formed which analyzed 60.5% zinc and is believed to be zinc oxychloride. The strippant was analyzed and contained 2.3 gms of zinc. 73 percent of the zinc was stripped from the solvent, but in the absence of ammonium chloride, zinc oxychloride formed instead of zinc ammine chloride.

Example 4

175 ml of 20 volume percent adogen 27% (secondary amine) and kerosene 80 volume percent was contacted with 25 ml of 200 g/l zinc in zinc chloride. The solvent was loaded to 9 grams per liter zinc. The solvent was stripped at 80° C. with a solution of 280 g/l ammonium chloride, 280 g/l zinc chloride and 54 g/l ammonia. On cooling a precipitate of zinc ammine chloride was recovered. The solvent assayed 7.6 g/l zinc, showing that despite the very high chloride and zinc concentrations there was some stripping.

Example 5

175 ml of 50 volume percent tributyl phospate and 50 volume percent kerosene was contacted with 25 ml of 200 g/l zinc as zinc chloride. 18.7 g/l zinc as zinc chloride loaded onto the solvent. The solvent was stripped with 25 ml of an aqueous stream containing 140 g/l ammonium chloride, 140 g/l zinc chloride and 76 g/l ammonia at room temperature. 3.8 grams of solid zinc ammine chloride were recovered. The solvent after stripping contained 7.6 g/l zinc.

Example 6

175 ml of 50 volume percent tributyl phosphate and 50 volume percent kerosene was contacted with 25 ml of 200 g/l zinc as zinc chloride. 18.5 g/l zinc as zinc chloride loaded onto the solvent. The solvent was stripped at room temperature by 50 ml of an aqueous solution containing 54 g/l ammonia. A precipitate of zinc oxychloride formed and more than one half the total zinc stripped was in this form. The example shows the necessity for a concentration of ammonium chloride in the strippant in order to form the crystalline zinc ammine chloride.

Example 7

50% tributyl phosphate, 50% kerosene was loaded with zinc chloride. A strip solution (organic to aqueous ratio 3:8) containing 55 g/l zinc as zinc chloride, 140 g/l ammonium chloride and 12 g/l free ammonia was contacted with the solvent. 6.1 grams of zinc amine chloride were precipitated and removed by filtration. 12 g/l ammonia (1.6 grams $NH_3$) was added and the solvent contacted again. On the second contact 7.1 grams of zinc ammine chloride precipitated. The process was repeated a third and fourth time with the recovery of additional zinc ammine chloride.

The example shows that the solvent can be stripped by repeated contacts of the ammonium chloride-ammonia strippant to recover the zinc as zinc ammine chloride.

What is claimed is:

1. A process for recovering zinc chloride from a solution comprising zinc chloride solubilized in an organic solvent comprising:
   (a) stripping zinc chloride from said solution comprising zinc chloride solubilized in an organic solvent with a stripping agent comprising an aqueous solution of at least about 75 g/l ammonium chloride and ammonium hydroxide;
   (b) allowing a crystalline zinc chloride ammine compound to form in the stripping solution;
   (c) separating the formed zinc chloride ammine compound from the stripping solution; and
   (d) recovering zinc chloride from the zinc chloride ammine compound.

2. The process of claim 1 in which the concentration of ammonium chloride in said aqueous solution is within the range of about 75–300 g/l.

3. The process of claim 1 in which the concentration of ammonium hydroxide in said aqueous solution is equal to about two moles per mole of zinc to be stripped.

4. The process of claim 1 in which the aqueous stripping solution prior to contact with the organic solvent also comprises zinc in solution within the range of about 20–200 g/l expressed as zinc chloride.

5. A method of producing anhydrous zinc chloride comprising the steps of:
   (a) contacting an aqueous solution containing zinc chloride with an organic extractant to extract zinc chloride into said organic extractant;
   (b) contacting said loaded organic extractant with a stripping agent comprising an aqueous solution of ammonium hydroxide and at least about 75 g/l ammonium chloride, to cause the formation of zinc ammonium chloride and thereby strip zinc chloride from said loaded organic extractant at a temperature sufficiently high to dissolve at least a portion of said formed zinc ammonium chloride;
   (c) cooling the loaded stripping solution to crystallize a zinc chloride ammine compound;
   (d) separating said zinc ammine chloride compound; and
   (e) heating said zinc ammine chloride compound to form anhydrous zinc chloride.

6. A method according to claim 5 wherein said organic extractant of step (a) is selected from the group consisting of tributyl phosphate, primary secondary and tertiary amines, and quaternary amine salts.

7. A method according to claim 5 in which the concentration of said ammonium hydroxide in said aqueous stripping solution is equal to about two moles per mole of zinc to be stripped.

8. A method of separating zinc chloride from an aqueous solution containing at least one impurity selected from the group consisting of iron, copper, lead, cadmium, alkali metals, and alkaline earth metals which comprises subjecting the aqueous solution at a pH in the range of about 1 to 5 to extraction with an organic extractant selected from the group consisting of tributyl phosphate, primary, secondary, and tertiary amines, and quaternary amine salts to form an organic phase containing zinc chloride, then contacting said loaded organic extractant with an aqueous stripping solution comprising at least about 75 g/l ammonium chloride and ammonium hydroxide to form a zinc ammine chloride compound and recovering zinc chloride therefrom.

* * * * *